(No Model.)

J. E. BINGHAM.
PATTERN FOR ASCERTAINING SIZES AND SHAPES OF HORSESHOES.

No. 355,371. Patented Jan. 4, 1887.

ATTEST-
J. Henry Kaiser.
Harry L. Amer.

John E. Bingham
INVENTOR
By
E. Everett Ellis
his Attorney

N. PETERS, Photo-Lithographer, Washington, D. C.

UNITED STATES PATENT OFFICE.

JOHN E. BINGHAM, OF WALLA WALLA, WASHINGTON TERRITORY.

PATTERN FOR ASCERTAINING SIZES AND SHAPES OF HORSESHOES.

SPECIFICATION forming part of Letters Patent No. 355,371, dated January 4, 1887.

Application filed June 8, 1886. Serial No. 204,494. (No model.)

*To all whom it may concern:*

Be it known that I, JOHN E. BINGHAM, a citizen of the United States, residing at Walla Walla, in the county of Walla Walla and Territory of Washington, have invented certain new and useful Improvements in Patterns for Ascertaining Sizes and Shapes of Horseshoes; and I do hereby declare the following to be a full, clear, and exact description of the invention, such as will enable others skilled in the art to which it appertains to make and use the same.

In a former patent granted me the 27th day of July, 1886, No. 346,350, I have described a certain new manufacture by which the feet or hoofs of horses varying in size and shape may be fitted accurately with shoes without the necessity of reheating or bending the material of which the sections comprising the shoe are constituted; and the purpose of the present invention is to enable the owners of horses desirous of adopting this mode of fitting their horses with shoes to first ascertain at a small cost the particular size or sizes of sections to order from the manufacturer before purchasing the article itself; and the invention consists in a pattern for ascertaining the sizes and shapes of the feet or hoofs of horses, which is constituted of a number of interchangeable conformable pieces of paper, pasteboard, or other material, which vary in dimensions and curvature, and which may be arranged together in the configuration of horseshoes of different sizes and shapes, substantially as will hereinafter appear.

It is evident from the invention referred to that in order for the owners of horses to ascertain the particular size and shape of shoes desired to be ordered or purchased from the manufacturer, it will be necessary for them to either outline the hoof or hoofs upon a piece of paper, or make a measurement thereof in some other way that is attended with more or less trouble and inconvenience; and, besides, these methods are apt to result in mistakes on the part of owners of horses and result in their being unable to use the shoes when obtained. By the present invention the owners of horses may first supply themselves with a set of pieces or patterns at a very small cost, and then by the use or employment thereof ascertain the exact size or style of pieces to be ordered from the factory by which to construct shoes conforming precisely to the size and shape of the ground-surface of the hoofs or feet.

Figure 1:
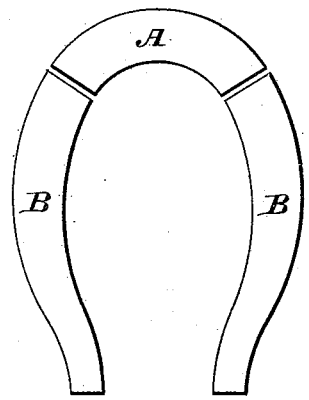
Figure 2:
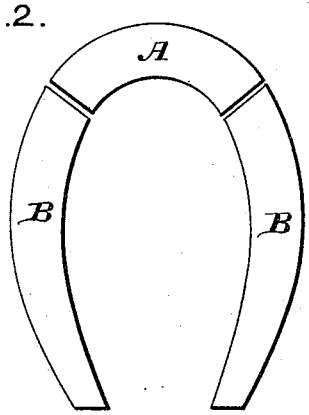
Figure 3:
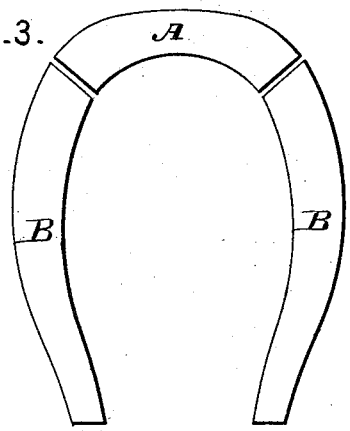

In the accompanying drawings I have illustrated in Figure 1 a number of the pieces so united as to clearly indicate the purpose of the invention, A representing that portion of a horseshoe ordinarily termed the "toe-piece," while B B each represent a side piece. Fig. 2 represents a number of pieces shown in the preceding figure as being of varying size or length and curvature; and Fig. 3 is a like view representing a further variation in the curvature of the parts, and especially of the toe-piece.

In the practice of the invention about five different sizes of toe-pieces are required for the front feet and about the same number of toe-pieces for the hind feet. The curves of these five toe-pieces should correspond with the ordinary outlines of the feet. In exceptional cases a toe-piece designed for the hind foot will be required to fit a front foot, and sometimes a toe-piece designed for a front foot will be required to fit a peculiarly-shaped hind foot. Of the side pieces about four different curves of each pair will suffice; but each curve will need to be made of about four different lengths, and thus there will be sixteen right and sixteen left side pieces and ten toe-pieces. The side pieces are used on the front or hind feet alike. Frequently the opposite sides of the same foot do not correspond in either length or curve. In such cases suitable side pieces should be used, so as to exactly fit the peculiarities of each side. Any of the ten toe-pieces can be arranged in combination with any of the right or left side pieces, so as to fit a very great number of differently-shaped feet, and thus can several hundred different configurations of shoe be made up or had.

It will be understood that in supplying the market with these patterns the several sizes of toe and side pieces employed may be either all printed together upon a sheet of paper or a strip of pasteboard or other material, or the several pieces may be done up in packages in a separated or severed state.

I do not resort to the marking out of my patterns from the parts constituting the shoes or sections thereof covered by my former patent referred to, for the reason that in practicing the invention of such patent I am constantly using different styles of joints for the sections, while these patterns need only be of one style of joinder, they performing rather a function of measurement than that of a mechanical one. Consequently I prefer independent means for obtaining these patterns—such, for instance, as first marking out or printing the diagrams of the various sizes of hoofs and then cutting them out in any suitable manner; or, instead, the charts on which they are printed may be left unsevered, to be cut out by the purchasers themselves.

Having thus described my invention, what I claim as new, and desire to secure by Letters Patent, is—

As an article of manufacture, a pattern for ascertaining the size and shape of the hoofs of horses, consisting of a number of interchangeable conformable pieces of paper, pasteboard, or other suitable material, which vary in dimensions and curvature, and which may be arranged together in the configuration or outline of horseshoes of different sizes and shapes, substantially as described.

In testimony whereof I affix my signature in presence of two witnesses.

JOHN E. BINGHAM.

Witnesses:
  E. EVERETT ELLIS,
  CURTIS LAMMOND.